April 9, 1968
A. R. GETZIN
3,377,089
LOCK JOINT FOR STRUCTURAL MEMBERS
Filed July 28, 1965
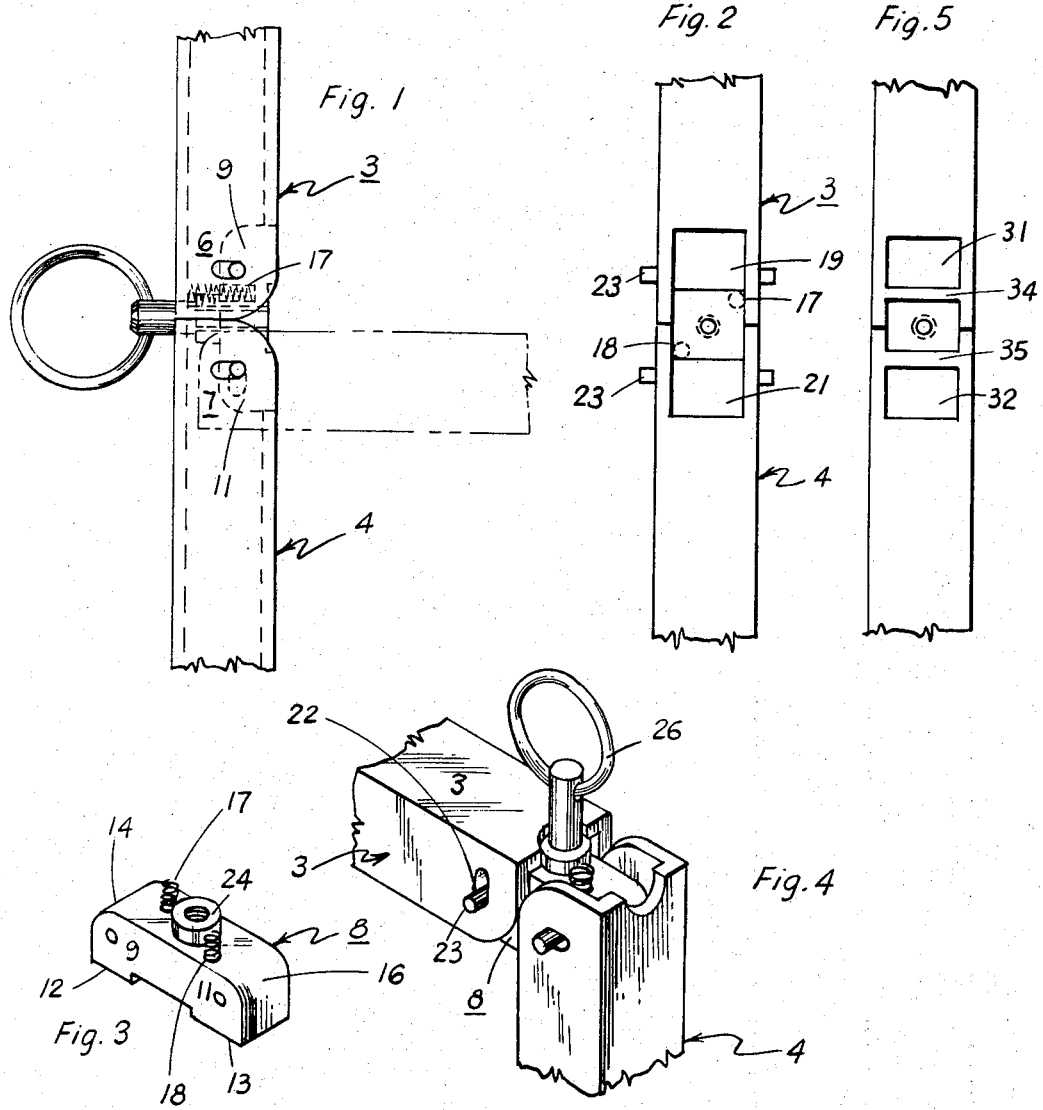
INVENTOR.
ALLAN R. GETZIN
BY
Ralph B. Brick
ATTORNEY United States Patent Office 3,377,089
Patented Apr. 9, 1968

3,377,089
LOCK JOINT FOR STRUCTURAL MEMBERS
Allan R. Getzin, Jeffersontown, Ky., assignor to American Air Filter Company, Inc., Louisville, Ky., a corporation of Delaware
Filed July 28, 1965, Ser. No. 475,428
9 Claims. (Cl. 287—99)

ABSTRACT OF THE DISCLOSURE

An improved lock joint for two structural members wherein a detent carrying tongue in one structural member slidably engages in loose nesting relationship in a recess of the other structural member when the structural members are in collapsed position, and wherein the detent on the tongue is spring-urged laterally into a detent aperture on such other member when the structural members are in erect position, the detent being sized in conformity with the aperture to permit snug detent-aperture engagement.

The present invention relates to an improved structural assembly and more particularly to an improved lock joint for connecting structural members in preselected angular position.

In accordance with the present invention an efficient, straightforward and economical lock joint assembly for connecting structural members is provided which permits automatic and positive locking of structural members together in preselected angular relationship upon the mere pivoting of one member relative the other. Further, the present invention provides an arrangement wherein structural members can be selectively hinged or detached in collapsed position when the lock joint assembly is disengaged, the lock joint assembly presenting a minimum of protrusions when in locked or unlocked position. It is to be understood that the novel lock joint assembly of the present invention has a multitude of uses and can be employed in any one of a number of structural forms where collapsibility is desired—such as in poles for portable shelters, card table legs, umbrellas, bicycles, etc.

Various other features of the present invention will become obvious to one skilled in the art upon reading the disclosure set forth hereinafter.

More particularly, the present invention provides an improved lock joint for connecting structural members in preselected angular position comprising: a first structural member having a tongue means connected to and extending outwardly therefrom; the tongue means having a locking detent projecting from one wall thereof; a second structural member having a recess sized to receive the tongue means connected to the first structural member in loose, nesting engagement therewith, the recess including a detent aperture in one wall thereof sized to receive the locking detent of the tongue means in snug nesting engagement therewith; and spring means positionable between a wall of the recess and the tongue means to urge the tongue means in a direction wherein the locking detent thereon engages in the detent aperture to hold the structural members together in fast preselected angular position.

It is to be understood that various changes can be made in the arrangement, form and construction of the apparatus disclosed without departing from the scope or spirit of the present invention.

Referring to the drawing which discloses an advantageous embodiment of the present invention and a modification thereto:

FIGURE 1 is a side view of the inventive lock joint arrangement employed in connecting two structural members in preselected end-to-end position, the phantom line showing one structural member folded in collapsed position with respect to the other;

FIGURE 2 is a bottom view of the lock joint assembly of FIGURE 1;

FIGURE 3 is an isometric view of the tongue member employed in the lock joint assembly of FIGURE 1;

FIGURE 4 is an isometric view of a portion of the lock joint assembly with the structural members as disclosed in FIGURE 1 showing such assembly in partially collapsed position; and FIGURE 5 is a bottom view similar to that of FIGURE 2 showing a modification to the lock joint assembly wherein the aperture is completely enclosed and the slot and pin retention device of FIGURES 1 to 4 is eliminated.

Referring to FIGURES 1 and 2, two similar structural members 3 and 4 are shown positioned in end-to-end relationship. The members as shown are of rectangular cross section and are hollow in nature to provide opposed recesses 6 and 7. These structural members, which can be formed from any one of a number of suitably rigid materials such as extruded aluminum, can be of various configurations in accordance with the superstructure with which they are adapted, and it is to be understood that the present invention is not to be considered as limited to the end-to-end structural arrangement disclosed.

The connection of the structural members in accordance with the present invention is accomplished through a tongue member 8 (FIGURE 3). Member 8 includes opposed tongue portions 9 and 11, each having a locking detent 12, 13, respectively, projecting from one wall thereof. It is to be noted that tongue portions 9, 11 have upper rounded shoulders 14, 16, respectively, to provide the necessary clearance so as to permit ready pivotable movement of one structural member relative the other when the tongue portions 9, 11 are properly mounted in their recesses 6, 7, respectively. It further is to be noted that on the wall of tongue portions 9, 11 opposite the wall on which detents 12, 13 extend, there are mounted spring members 17, 18, respectively. When the tongue has been properly assembled with tongue portions 9, 11 engaging in recesses 6, 7 of structural members 3, 4, respectively, springs 17 and 18 serve to urge the tongue portions and their associated locking detents 12 and 13, respectively, into engagement with detent apertures provided in the walls of the recesses. As disclosed in FIGURE 4 of the drawing, the detent apertures in each of the structural members is in the form of cut-aways in the recess walls to provide opposed slotted ends 19, 21, respectively, the slotted ends serving to receive the locking detents 12 and 13, respectively, on the tongue portions 9, 11 of the tongue member 8. It is to be understood that the locking detents as well as the detent apertures can be chamferred at the corners in order to permit appropriate nesting engagement, the detents being sized in conformity with the apertures to permit snug engagement. It further is to be understood that the detents in the apertures can be sized and contoured in such a manner as to permit the locking of the structural members in a preselected angular position. As disclosed in FIGURE 1, the structural members are locked at 180 degrees. However, it is possible to so contour the detents and the detent apertures along the side faces thereof that engagement of the detents in the apertures is accomplished when one structural member is pivoted with respect to the other at a different angle.

In order to hold structural members 3 and 4 in connected relationship to the tongue 8 so that the arrangement may be collapsed in hinged form, a pair of opposed longitudinally-extending slotted apertures 22 are provided in the opposed walls of each of the recesses 6 and 7 adjacent the slotted aperture receiving detents 19 and 21. These slotted apertures 22 serve to receive pin members 23 which are mounted on each side of the tongue portions to adjustably connect the tongue means with the first and second structural members. It is to be noted that tongue 8 is provided with an internally threaded collar 24 which serves to receive a threaded gripping ring assembly 26. This gripping ring assembly is utilized to disengage the detents of the tongue portions for collapse purposes. It also is to be noted that the gripping ring assembly 26 can be unscrewed so as to avoid any protrusions when the structural unit is in erect position. Furthermore, it is possible to completely eliminate this gripping ring assembly and merely press the detents out of engagement with their detent apertures manually.

Referring to FIGURE 5 of the drawings, it will be noted that the slotted aperture and pin retention means as disclosed in FIGURES 2 and 4 of the drawings is eliminated. In this embodiment of the invention, the detent apertures 31 and 32 are not in slotted opposed cut-away form but rather are fully surrounded apertures, the metal bars 34 and 35 serving to prevent any longitudinal movement of one structural member relative the other.

From the foregoing description, it can be readily seen that an economical, straightforward lock joint assembly for connecting structural members is provided. It is only necessary to insert the tongue members in the recesses and pivot one structural member relative the other toward the desired preselected angle; as the angle is approached, the springs 17 and 18 engage against the wall of the recess to urge the tongue portions in an opposite direction toward locking detent apertures. Once the locking detents engage into the apertures, the structural unit is locked into place at the preselected angle.

The invention claimed is:

1. An improved lock joint for connecting structural members in preselected angular position comprising: a first structural member having a tongue means with one end received thereby and an opposite end extending axially outwardly therefrom, said tongue means having a locking detent projecting laterally from one wall thereof; a second structural member having a recess slidably receiving the other end of said tongue means connected to said first structural member in loose slidably nesting engagement therewith, said recess including a detent aperture in one wall thereof of a size substantially equal to said locking detent to receive said locking detent of said tongue means in snug nesting and aperture filling engagement therewith; and spring means biased between the opposite wall of said recess in said second structural member and said tongue means to urge said tongue means in a lateral direction away from said wall so that said locking detent engages in snug conformity with said detent aperture to hold said structural members together in a fast preselected angular position; means in each of said structural members for retaining said tongue ends thereto and allowing lateral movement thereof in at least one of said members, with said movement being transverse to the longitudinal axis of said one member.

2. The apparatus of claim 1 and retention means for said tongue means to slidably retain said tongue means connected to said first structural member in loose nesting engagement in said recess of said second structural member.

3. The apparatus of claim 1, said recess of said second structural member being positioned at one end of said second structural member to permit end-to-end connection of said first and second structural members.

4. The apparatus of claim 3, said second structural member being hollow to provide said end recess.

5. An improved lock joint for connecting structural members in preselected angular position comprising first and second structural members each having a tongue receiving recess therein, including a detent aperture in one wall thereof; a tongue means including opposed tongue portions sized to loosely nest in the recesses of said first and second structural members, said tongue portions each having a locking detent projecting laterally from one wall thereof sized to snugly nest in a detent aperture of a recess said detent aperture being of a size substantiallly equal to said locking detent to be filled thereby; and spring means biased between the opposite walls of said recesses in each of said structural members and said tongue portions to urge said tongue portions in a lateral direction away from said walls so that said locking detents thereon engage in snug conformity with said detent apertures to hold said structural members together in a fast preselected angular position; means in each of said structural members for retaining said opposed tongue portions therein and allowing lateral movement thereof in both of said members, with said movement being transverse to the longitudinal axes of said members.

6. The apparatus of claim 5, said recesses of said structural members being positioned at the ends thereof to permit end-to-end connection of such structural members.

7. The apparatus of claim 6, said structural members being hollow to provide said recesses.

8. An improved lock joint for connecting structural members in preselected angular position comprising: first and second hollow structural members positioned in end-to-end relationship to provide opposed tongue receiving recesses, one wall of each of said recesses of said end-to-end structural members being cut away to provide opposed slotted end portions serving as detent apertures, with opposed adjacent facing walls of each of said recesses being contoured to permit relative pivotal movement of said structural members; a tongue means including opposed tongue portions sized to loosely nest in the recesses of said first and second structural members, said tongue portions each having a locking detent projecting from one wall thereof sized to snugly nest in a slotted detent aperture of a recess; a pair of opposed longitudinally-extending slotted apertures in said opposed walls of each of said recesses adjacent said slotted aperture receiving detent wall; a pair of pin members on each of said tongue portions slidably engaging in said slotted apertures to adjustably connect said tongue means with said first and second structural members; and spring members mounted on each of said tongue portions to abut against a wall of the recess in which said tongue portion engages opposite said detent aperture to urge said tongue portion so that said locking detent thereon engages in said detent aperture to hold said structural members together in fast preselected angular position.

9. An improved lock joint for connecting structural members at preselected angular position comprising: a first structural member having a tongue means connected to and extending outwardly therefrom, said tongue means having a locking detent projecting from one wall thereof; a second structural member having a recess sized to receive said tongue means connected to said first structural member in loose nesting engagement therewith, said recess including a detent aperture in one wall thereof sized to receive said locking detent of said tongue means in snug nesting engagement therewith; spring means positioned to extend between a wall of said recess and said tongue means to urge said tongue means so that said locking detent engages in said detent aperture to hold said structural members together in a fast, preselected angular position; and retention means for said tongue means to slidably retain said tongue means connected to said first structural member in loose, nesting engagement in said recess of said second structural member, said retention means including longitudinally extending slotted aperture means in the recess wall of said second structural member, and pin means on said tongue means of said first structural member slidably engaged in said slotted aperture means.

References Cited
UNITED STATES PATENTS

| | | | |
|---|---|---|---|
| 1,639,009 | 8/1927 | Singley | 287—99 |
| 1,798,163 | 3/1931 | Krenzke | 287—99 |
| 3,187,373 | 6/1965 | Fisher | 287—99 X |

FOREIGN PATENTS

| | | |
|---|---|---|
| 122,669 | 5/1931 | Austria. |
| 165,090 | 1/1934 | Switzerland. |

CARL W. TOMLIN, *Primary Examiner.*

ANDREW KUNDRAT, *Assistant Examiner.*